(12) United States Patent
Alexanian et al.

(10) Patent No.: US 6,351,366 B1
(45) Date of Patent: *Feb. 26, 2002

(54) BATTERY POWERED REMOTE SWITCH CONTROLLER (76) Inventors: George Alexanian, 4761 W. Jacquelyn Ave.; Eugene S. Carlson, 4582 W. Jacquelyn Ave., both of Fresno, CA (US) 93722

(*) Notice: Subject to any disclaimer, the term of this patent is extended or adjusted under 35 U.S.C. 154(b) by 0 days.

This patent is subject to a terminal disclaimer.

(21) Appl. No.: 09/315,375

(22) Filed: May 18, 1999

Related U.S. Application Data (63) Continuation-in-part of application No. 09/063,871, filed on Apr. 20, 1998, now Pat. No. 5,914,847.

(51) Int. Cl.$^7$ .................................................. H01H 9/00
(52) U.S. Cl. .................... 361/189; 307/113; 251/129.04
(58) Field of Search ................................ 361/152, 156, 361/170, 189, 196, 199; 320/125, 136, 155; 307/85, 86, 113, 115, 31; 239/69, 70; 251/129.01, 129.04, 129.15, 129.05

(56) References Cited

U.S. PATENT DOCUMENTS

| | | |
|---|---|---|
| 3,825,153 A | 7/1974 | Patrick |
| 3,921,052 A | 11/1975 | Milano |
| 4,171,539 A | 10/1979 | Tawfik |
| 4,203,153 A | 5/1980 | Boyd |
| 4,423,484 A | 12/1983 | Hamilton |
| 4,645,882 A * | 2/1987 | Nakayama et al. ......... 379/387 |
| 4,679,766 A * | 7/1987 | Cuming ....................... 379/387 |
| 4,716,490 A * | 12/1987 | Alexanian ................... 361/155 |
| 4,718,454 A | 1/1988 | Appleby |
| 5,251,325 A | 10/1993 | Davis |
| 5,347,421 A | 9/1994 | Alexanian |
| 5,498,951 A | 3/1996 | Okamura |
| 5,566,081 A | 10/1996 | Yoshizawa |
| 5,572,108 A | 11/1996 | Windes |
| 5,815,365 A * | 9/1998 | Stege ......................... 361/195 |

* cited by examiner

Primary Examiner—Kim Huynh
(74) Attorney, Agent, or Firm—Mark D. Miller (57) ABSTRACT

An inexpensive battery-powered switch or irrigation valve controller designed to conserve the life of both the low voltage battery source which operates the processing circuitry of the controller, as well as the high voltage battery source which operates the external switches or irrigation valve solenoids. The high voltage battery source is conserved by maintaining the primary switch-activating capacitor in a discharged state and delaying the charging of this capacitor until just before it is to be discharged. The high voltage battery source is also conserved by isolating it from the primary capacitor immediately prior to discharge, thereby avoiding a draw of energy from the high voltage battery source itself during discharge. The low voltage battery source is conserved through the action of the microprocessor that remains dormant except for periodic sampling. The controller also includes reliable DC circuits for operating remote switches or valve solenoids at distances of up to several miles. These unique circuits of the invention allow the use of ordinary gauge buried copper wire without concern for possible deterioration of the wires from the galvanic effect of the inductive field created by the buried wires carrying the direct current (DC) power.

29 Claims, 6 Drawing Sheets

BATTERY POWERED REMOTE SWITCH CONTROLLER

This is a continuation-in-part of application number 09/063,871 filed on Apr. 20, 1998, now U.S. Pat. No. 5,914,847.

BACKGROUND OF THE INVENTION

The present invention relates to controllers, and more particularly to an improved battery powered programmable controller having extended battery life for controlling distant switches such as irrigation valve solenoids.

FIELD OF THE INVENTION

Programmable irrigation valve controllers are well known in the art. Such controllers are used to open and close irrigation valves by providing electric current to solenoids located in close proximity to the valves. Relatively large electric currents are required to activate and deactivate such solenoids. Providing this required electricity is a simple matter if an external power source is readily available, such as a power line. However, in many commercial agricultural and horticultural situations, controllers must be located at remote field locations where it is impossible or impractical to run a power line or otherwise provide an external power source. In some situations, the valves may be in even more remote locations that are themselves hundreds or even thousands of feet from the controller. Thus, insufficient voltage or current at the both the controller and at the valves is a common problem, especially where long distances or multiple valves are involved. Although some battery powered irrigation controllers have been developed they do not properly address these situations.

A significant limitation of existing battery powered irrigation controllers is battery life. Two voltage levels are generally required by such controllers: a law voltage level (which can be supplied by batteries, e.g. 3.5 volts) to operate the programming circuitry, and a higher voltage level (which can be supplied by a second set of batteries, e.g. 9 volts) to provide the necessary electrical impulses to operate the valve solenoids. The batteries on most existing battery powered controllers must be changed every few weeks or months, making them inconvenient to maintain and potentially unreliable to depend on for controlling irrigation cycles. At least one controller has addressed the problem of conserving the low voltage batteries used to operate the computing circuitry. In U.S. Pat. No. 4,423,484 to Hamilton, the microcomputer is turned off between cycles thereby conserving the low voltage batteries. However, the Hamilton controller does not address conservation of the higher voltage batteries used to operate the solenoids.

It is typical for an irrigation controller to use charging capacitors to operate the valve latching solenoids. These are generally large capacitors of 1000 micro farads or more. Most controllers (including Hamilton) maintain these capacitors in a charged condition, ready for immediate discharge to the solenoid upon receipt of a signal from the microprocessor (see e.g. U.S. Pat. No. 4,718,454 to Appleby). In addition, in most controllers these capacitors have an uninterrupted connection back to the high voltage (e.g. 9, 12, 18 or more volts) batteries from which they are charged. Both of these situations reduce the life of the high voltage batteries, and give rise to other potential problems with the controller.

It is known that all charged capacitors leak over time. This places a constant drain on the high voltage batteries to which they are connected. Such leakage significantly increases with temperature increases. Thus, a fully charged capacitor in a controller located in the middle of an unshaded field during the hot summer months can rapidly deplete the high voltage batteries, even when not in use. The larger the capacitor, the larger the leakage current. Also the higher the ambient temperature, the higher the leakage. This leakage is very significant and could be as much as hundreds of microamps. The leakage causes the capacitor to draw on the battery power supply in order to stay fully charged, thereby wasting energy and leading to the frequent need to change batteries without even any solenoid operation. Preventing this leakage would conserve the life of the high voltage batteries.

Battery operated controllers such as Hamilton use the high voltage batteries for operating both the solenoids and the electronics. Since most low power circuits operate from 3 to 5 volts DC, the high voltage batteries must be reduced and regulated, thereby wasting a considerable amount of energy.

In all controllers, the large capacitors are fully discharged in order to operate the valve solenoids. The capacitors are then recharged from the high voltage batteries. At the instant the discharge occurs, current may also be drawn directly from the high voltage batteries themselves, resulting in unnecessary depletion of the high voltage batteries.

Reliable operation of water valve solenoids is essential to ensure that water is regularly delivered to plants. Typical irrigation systems are designed to use 24 volts of alternating current (AC) to activate and control electric solenoids. However, AC powered irrigation systems suffer from several drawbacks. First, AC voltage drops over long runs of wire such that reliable voltage delivery cannot be assured beyond a few thousand feet. Where multiple solenoids are operated by a single controller, long runs of parallel wires in close proximity to each other may result in capacitive coupling: leakage current and floating voltages induced by energized adjacent wires. This effect may cause unwanted valves to turn on, or fail to cause valves to turn off. Other problems with AC systems include potential burn out of solenoids close to the controller because of excessive primary voltage.

Irrigation valve controlling systems also generally suffer from susceptibility to lightning, and power outages. A lightning strike on a valve in the field can couple onto the buried wires and run back to the controller with devastating results. A power outage can interrupt irrigation cycles potentially inducing stress to vegetation.

A conventional solution to the problem of AC voltage drops over long runs of wire is to provide thick, low-gauge solid wire (e.g. 8 gauge solid copper wire) which has a lower resistance factor than the thinner, higher-gauge wire. This solution provides a reliable method of controlling remote solenoids by decreasing voltage drops. However, the high cost of long runs of low-gauge wire becomes prohibitive, especially when several runs are required to operate several remote solenoids simultaneously. In addition, since the wires are carrying AC, the capacitative, coupling problem is still present.

Another proposed solution is to provide direct current (DC) voltage through long runs of copper wire to the solenoids, since DC systems do not suffer from the capacitive coupling problems of AC systems. However, when copper wires carry DC for long periods of time, the galvanic effect of the inductive field created by buried wires carrying the direct current causes the copper in the wires themselves to deteriorate over time, resulting in unreliability and eventually requiring replacement. For this reason, such DC systems are only used in short distance, above ground installations. These systems also suffer from the general problems presented by lightning strikes and power outages.

A third option is to provide a DC power source at the same remote location as the valve itself utilizing on-site batteries, solar power, or an on-site diesel generator. The disadvantage of this approach is the high cost of a self-contained remote system, and the problems of reliability in the event batteries or generator fail, or the weather is overcast for several days.

My 1994 patent (No. 5,347,421) addresses these problems to some extent by providing an AC power saving module in the form of a local circuit for energizing a solenoid. However, the circuits described in the '421 patent require a constant (albeit very low) current flow while the valve is open. The low AC current requirements of the '421 circuits allow much longer or thinner wire run; however, since the wires are carrying AC, the capacitative coupling problem is still present.

SUMMARY OF THE INVENTION

The present invention overcomes the disadvantages of prior art irrigation control systems by providing a battery powered switch or irrigation valve controller that conserves the life of both the low voltage batteries which operate the controller circuitry as well as the high voltage batteries which operate the external switches or latching valve solenoids. Such external switches may be located great distances from the controller, and can be in the form of latching relays for industrial control applications such as turning on and off fans, lights, pumps, motors, air conditioners, and the like. The present invention also includes a reliable DC circuit for operating latching solenoids or other remote switches at distances of up to several miles from the battery operated controller. The circuit allows the use of ordinary gauge buried copper wire without concern for possible deterioration of the wires from the galvanic effect of the inductive field created by the buried wires carrying the direct current. The circuits of the present invention also provide an effective deterrent to lightning-induced damage, significantly reduce the current required by the switch or solenoid, and are compatible for use with battery operated control systems. The circuits are simple, inexpensive to build, and energy efficient.

In the battery operated controller of the present invention, two sets of batteries are used. A first set of one or more low voltage batteries (typically 3.0 to 3.6 volts) is dedicated to the operation of the internal circuitry of the controller (e.g. the microprocessor). This low voltage powers the controller circuitry directly without the need for regulation which would otherwise waste energy. In addition, the circuitry is used in a sampling mode such that it is asleep for about 90% of the time. Approximately ten times per second it wakes up and samples the programming inputs for about 10 milliseconds, and then goes back to sleep. The sleep mode power is about 15 microamps while the awake mode draws about 30 microamps, so the average power draw is only about 17 microamps, or a 99% power saving. Occasionally, there will be times when an optional display will be activated, such as during programming changes, which will draw more current (in the range of 2-3 milliamps for a few minutes). This arrangement extends the life of the low voltage battery source for as long as 8 to 10 years.

A second set of one or more high voltage batteries is provided which is only used for charging the capacitors which operate the remote switches or solenoids. This obviates any need to reduce or regulate this battery source for use by the electronic circuitry, so this potential energy loss is avoided.

In the present invention, the large capacitors may be located in close proximity to the switch or solenoid to be energized, which may be a long distance from the controller itself. These capacitors are not charged until just a few seconds before the switch or solenoid is to be energized. At that point, the circuitry enables a transistor or other switching device to turn on and charge such a capacitor through a current limiting resistor. Depending on the voltage of the high voltage batteries, after an appropriate time interval (of between 2 and 20 seconds), for all intents and purposes, the capacitor becomes fully charged. Higher voltage batteries (e.g. 24 or 36 volts) will require a shorter time interval (e.g. 2 seconds) to charge the capacitor; lower voltage batteries (e.g. 9 or 18 volts) will require a longer time interval (e.g. 5 to 10 seconds). Following an isolation step (discussed below), a switching device (e.g. relay, triac, or the like) is used to quickly discharge the capacitor into the remote switch or latching solenoid. Thereafter, the capacitor remains discharged waiting for the next operation. Leaving the capacitor uncharged for long periods of time effectively eliminates capacitive leakage current.

The present invention avoids another source of energy waste found in typical battery operation. With existing controllers, when the capacitor discharges, the charging resistor is still connected from the high voltage battery source to the switch or solenoid. This results in a further draw of current from the battery directly by the solenoid, which also depletes the battery. In the present design, the charging circuit is disabled and isolated by the charging transistor or switch a few milliseconds prior to the capacitive discharge, thereby eliminating this unnecessary power drain. The circuit remains isolated until an appropriate time interval (e.g. a few seconds) before the next operation, at which point the high voltage battery source is again connected to the capacitor for charging followed again by isolation immediately before discharge.

Lithium batteries are recommended for both the low and high voltage circuits. Lithium batteries have extremely long shelf life (10 years), extremely low self discharge (less than 1% per year), and are rated for full performance over a wide temperature range up to 85 degrees Centigrade. Most other types of batteries would self discharge under typical ambient conditions within a year. Also, lithium batteries have double the energy capacity of alkaline batteries, and are lighter in weight.

The circuit board of the present invention and the remote charging circuit may be separately potted (encapsulated) so as to prevent impurities from corroding any of the component parts.

In one embodiment of the invention, the circuitry includes at least one pair of DC power lines which originate from the controller. A single controller can operate several pairs of such power lines, each pair eventually leading through the circuitry described herein to a switch or solenoid in the field. In the field, the incoming pair of power lines is first attached to a relay which controls a set of contacts. When DC power is applied, the relay causes the contacts to close such that power is supplied through a resistor to a capacitor or other DC charge storage device included in the circuit. After a given time interval, depending upon the voltage level provided from the power source, the capacitor becomes substantially fully charged. The power is then shut off at the source which causes the relay to release the contacts which return to their original positions. This causes a secondary circuit to be completed which includes the capacitor and a switch or latching DC solenoid. The completion of this circuit causes the charge in the capacitor to be discharged into the switch or into the latching solenoid, activating it. Depending upon the polarity of the incoming DC power, the discharge of the capacitor will either turn the switch on or off, or will either open or close the solenoid. The release of the contacts also disconnects the secondary switch/solenoid circuit from the power supply lines, thereby eliminating potential lightning strike problems that would otherwise be present with a direct link back to the source.

Any appropriate on/off switch may be employed in the circuit. The controller supplies an appropriate activating or deactivating DC voltage when the switch is to be toggled. Accordingly, most of the time no DC current is carried over the lines, except for the few seconds needed to activate and deactivate the switch at the beginning and end of an operation. This all but eliminates any problems presented by the galvanic effect, and allows for considerably long wire runs.

If a solenoid is used, it should be of the latching variety, which means that once it is activated (opened or closed), it remains that way without the requirement of a constant current running through it, This provides the added benefit of extending the life of the solenoid since the coil thereof is not exposed to constant current which might result in overheating and failure.

It is therefore a primary object of the present invention to provide an improved battery powered switch controller having extended battery life.

It is also a primary object of the present invention to provide a reliable local circuit that may be attached to a far distant DC power supply or controller for use in operating a local switch, or a local latching solenoid attached to a water supply valve.

It is a further important object of the present invention to provide a battery powered programmable irrigation valve controller.

It is another important object of the present invention to provide a battery powered switch controller which does not maintain its activation/deactivation capacitors in a fully charged condition at all times.

It is another important object of the present invention to provide a battery powered controller for operating multiple switches at remote locations.

It is a further important object of the present invention to provide a battery powered programmable controller having circuitry which does not allow each capacitor to be charged until just before it is known to be needed for discharge to activate a switch or solenoid.

It is a further important object of the present invention to provide a battery powered valve controller having a load isolation circuit which engages to separate the high voltage batteries from the capacitors immediately prior to discharge of the capacitors.

It is a further important object of the present invention to provide a battery powered controller having a microprocessor circuit which isolates the capacitor from the high voltage batteries several milliseconds before the solenoid is discharged, so as not to also draw on the capacitor-charging batteries during the discharge operation.

It is a further object of the present invention to provide a battery powered programmable irrigation valve controller in which the circuitry does not perform continuous sampling, but instead samples only at regular intervals.

It is a further object of the present invention to provide a battery powered controller in which the circuitry is not running in a current consuming operation except at regular intervals for a few milliseconds, thereby prolonging the life of the battery.

It is a further object of the present invention to provide a battery powered controller in which the circuit board is encapsulated in epoxy so as to prevent impurities from corroding any of the component parts, and minimizing exposure to electrostatic discharge, It is a further object of the present invention to provide a battery powered controller which uses lithium batteries for both the high and low voltage batteries because of their greater reliability and long life.

It is a further important object of the present invention to provide a reliable remote DC circuit for use in operating a switch which saves energy by requiring very low current to activate and deactivate the switch.

It is a further important object of the present invention to provide a reliable remote DC circuit for use in operating a latching solenoid attached to a water supply valve requiring a very low current to activate or deactivate the latching solenoid.

It is a further object of the present invention to provide a secondary circuit which includes a capacitor and a switch or latching solenoid that is automatically disconnected from the DC power source when not in use thereby avoiding potential lightning strike problems.

It is a further object of the present invention to provide a reliable circuit for operating a switch or latching solenoid that may be attached to an DC power source over a long run of high gauge (low cost) copper wire without any galvanic effect It is a further object of the present invention to provide a remote circuit for operating a switch or a latching solenoid attached to a water supply valve that may be battery operated.

It is a further object of the present invention to provide a remote device for operating a remote switch or solenoid that allows for considerable savings in the costs for electric current and the costs associated with great lengths of low (larger) gauge wire.

Other objects of the invention will be apparent from the detailed descriptions and the claims herein.

DETAILED DESCRIPTION OF THE DRAWINGS

Figure 1:
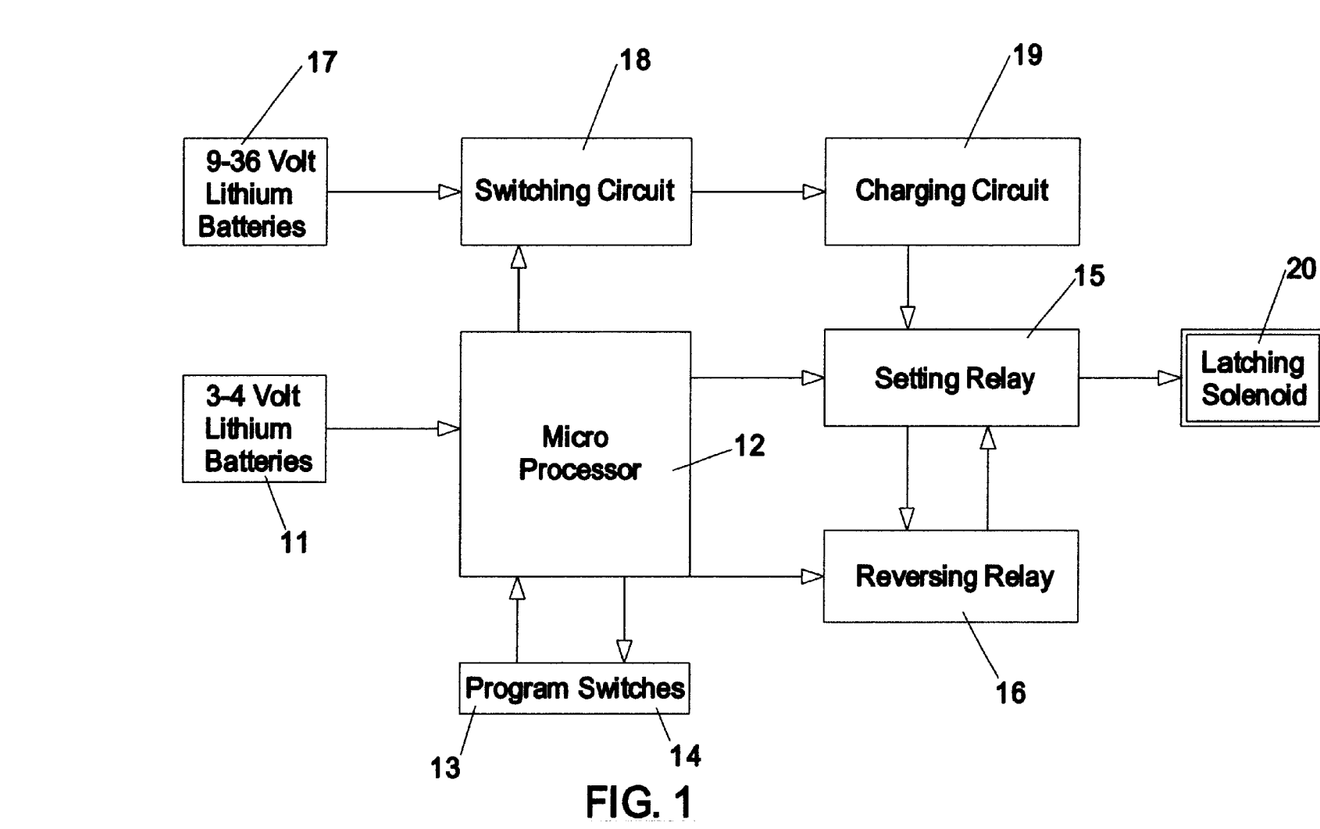
FIG. 1 is block diagram showing the general configuration of the battery powered controller of the present invention.
Figure 2:
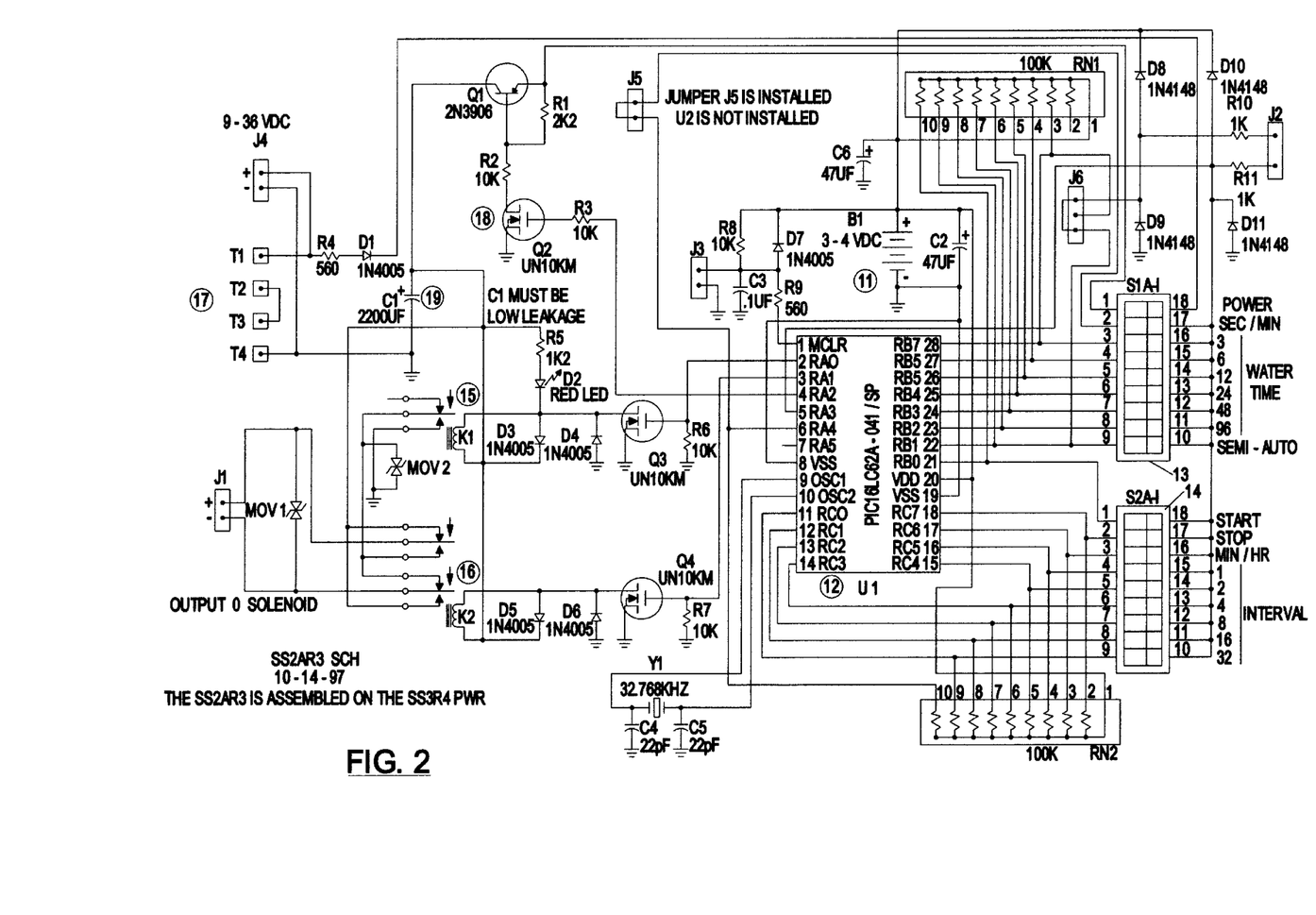
FIG. 2 is a circuit diagram of the battery powered controller of the present invention.

Referring to the drawings wherein like reference characters designate like or corresponding parts throughout the several views, and referring particularly to FIGS. 1 and 2, it is seen that the invention includes circuitry (e.g. a microprocessor) 12 powered by a 3.6 volt lithium battery source 11 made up of at least one battery. Although the following description refers to operation of a single capacitor and solenoid, the invention may be easily adapted to operate multiple capacitors and multiple solenoids or switches while maintaining the important power saving features described herein.

The circuitry may be programmed using any appropriate input means including without limitation push buttons, rotary switches, dip switches, keypad or a serial or parallel port to a computer. A display (LCD or LED or the like) may also be provided as part of the circuitry. For illustration purposes only, FIG. 1 depicts two sets of switches, set 13 and set 14 for input. Circuitry 12 controls a first relay 15 (K1) which is used to send a setting or activation discharge from a large capacitor 19 (C1) in the controller to a switch 20 (e.g. a solenoid to open a valve). It also controls a second relay 16 (K2) which is used to send a reverse or de-activation discharge from large capacitor 19 to switch 20 (e.g. to close a valve).

The circuitry 12 also controls a switching circuit 18 (using transistors Q1 and Q2) between the high voltage battery source 17 (if an AC or DC power source is available, it can be used instead of battery source 17) and the large charging capacitors such as 19. Two functions are performed by this circuit. The first function is to delay the charging of capacitor 19 until a given interval just before it is to be discharged to solenoid 20. The second function is to isolate the charging battery source 17 from the recently-charged capacitor 19 immediately prior to discharge.

Referring to FIG. 2, it is seen that the illustrated input switches of the first set 13 (S1A-I in FIG. 2), by way of example, provide the following possible input functions: power on/off(switch 1); selection between seconds and minutes (switch 2); water time of 3 units (switch 3); water time of 6 units (switch 4); water time of 12 units (switch 5); water time of 24 units (switch 6); water time of 48 units (switch 7); water time of 96 units (switch 8); and semi-automatic mode (switch 9). These timing units can be combined to provide a wide range of time settings.

The input switches of the second set illustrated 14 (S2A-I in FIG. 2), by way of example, provide the following possible input functions: start (switch 1); stop (switch 2); select between minutes and hours (switch 3); time interval of 1 unit (switch 4); time interval of 2 units (switch 5); time interval of 4 units (switch 6), time interval of 8 units (switch 7); time interval of 16 units (switch 8); time interval of 32 units (switch 9). These timing selections can also be combined.

Of course, different values and parameters can be established for the inputs to the circuitry, and input means other than dip switches (e.g. push buttons, keypads, rotary switches, RS-232, parallel, or other port) may also be used, particularly if remote addressability is desired.

The circuitry 12 reads or samples the input from switches 13 and 14 over line 31. This sampling is only performed at infrequent intervals (e.g. ten times per second for 10 milliseconds). During the remainder of the time, the circuitry is dormant and only consuming a few microamps from low voltage battery source 11. Meanwhile, capacitor 19 is left in an uncharged state. The sampling tells the circuitry what function is to be performed when, according to the input settings of switches 13 and 14.

Figure 3:
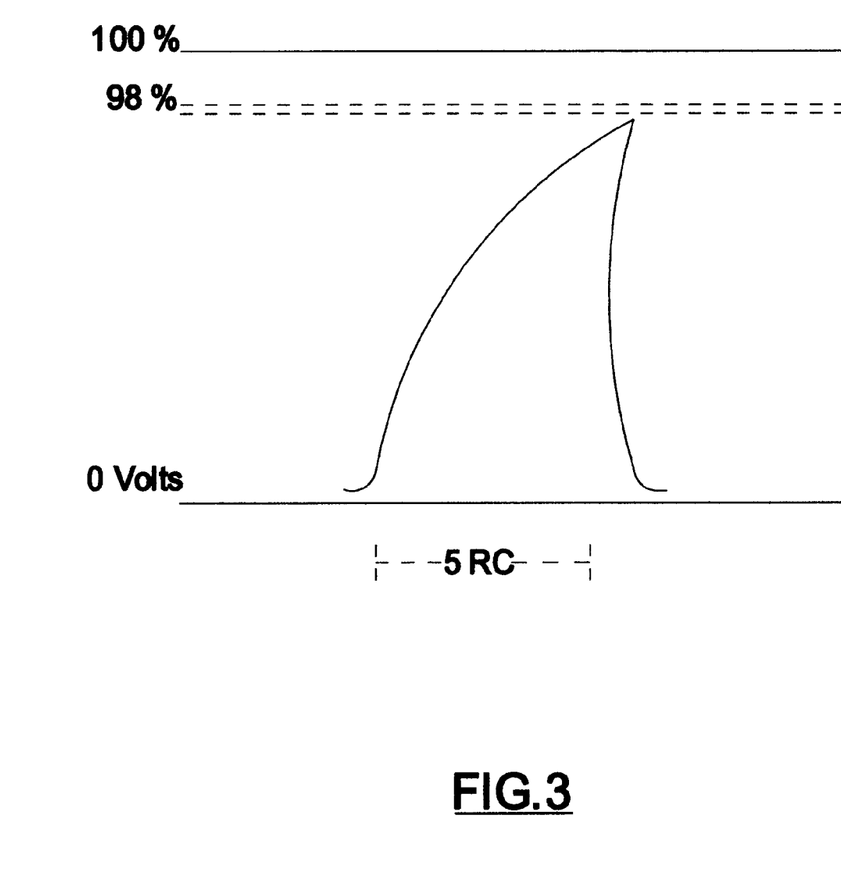
FIG. 3 is a chart showing the charge and discharge of a large capacitor of the present invention over time.

By using the sampling and its internal clock, the circuitry is able to detect that an operation (activation or deactivation) is upcoming. At an appropriate time before such operation is to occur, the circuitry sends a signal from pin 4 (see FIG. 2) to transistor Q2 causing transistor switch Q1 to make the connection between the high voltage battery source 17 and capacitor 19. This causes capacitor 19 to become charged (see FIG. 3). Then, just a few milliseconds before the time for discharging capacitor 19, the circuitry sends a second signal to turn off transistors Q1 and Q2 thereby isolating the high voltage battery source 17 from capacitor 19. Almost immediately thereafter, capacitor 19 is discharged to the switch or solenoid. Capacitor 19 remains in a discharged state until just before the next time an operation occurs. At that time, the above process is repeated for that operation, etc.

Circuitry 12 controls whether the charge sent to the switch or solenoid is an activation pulse (e.g. to open the solenoid) or deactivation pulse (e.g. to close the solenoid) by using relay 15 (K1) and double pole reversing relay 16 (K2). Solid state switching mechanisms could be used in place of relays K1 and K2. A signal from pin 2 to transistor Q3 operates relay K1 causing a direct charge to be sent via relay K1 to open the switch or solenoid 20. Signals from circuitry pins 2 and 3 to transistors Q3 and Q4 operate both relays K1 and K2, causing a reverse charge to be sent via relay K1 and double pole reversing relay K2 to close switch or solenoid 20.

Figure 7:
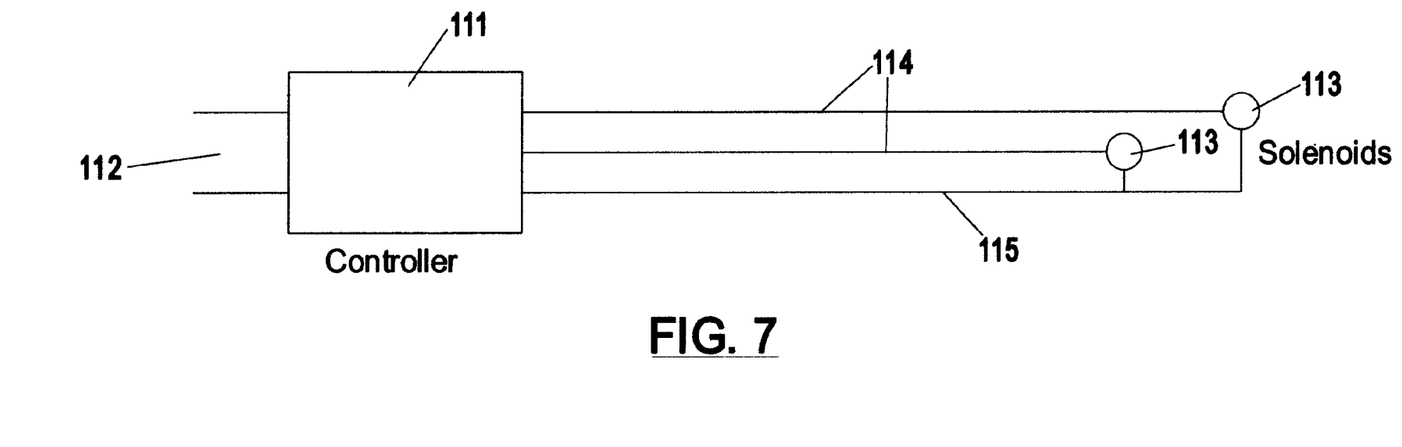
FIG. 7 is a schematic diagram of a prior art AC circuit for activating a solenoid.

The prior art circuit of FIG. 7, shows a typical AC solenoid controller 111 connected to a 115 volt AC input 112. Controller 111 is typically located at a central location and may be several hundred or several thousand feet from solenoids 113. A great deal of power (500 milliamps) is required to operate these solenoids; the proximity of output lines 114 and common line 115 may result in capacitive coupling; and the direct link between the solenoids and the controller exposes the controller to damage from lightning strikes.

Figure 8:
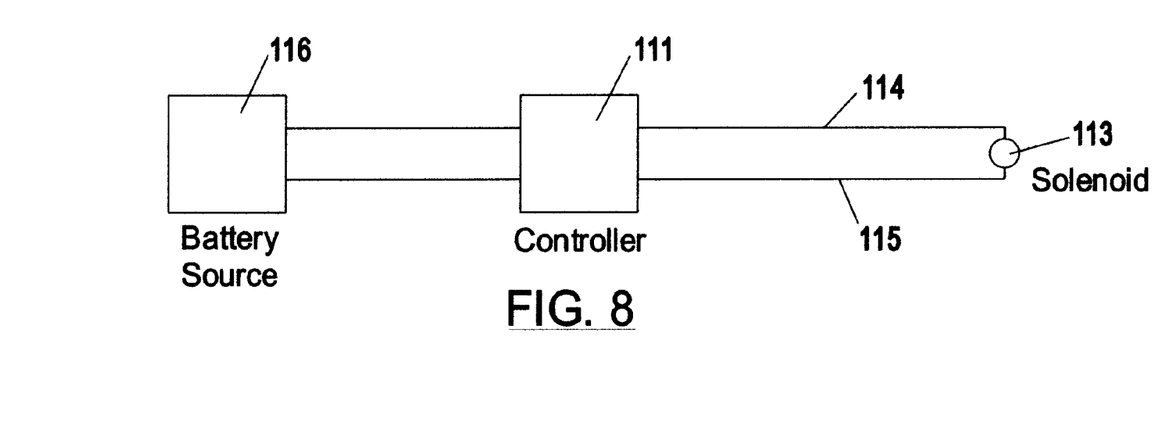
FIG. 8 is a schematic diagram of a prior art DC circuit for activating a solenoid.

Referring to the prior art DC circuit of FIG. 8, it is seen that a battery source 116 is connected to a controller 111 to provide DC current, and that DC current is supplied down lines 114 and 115 leading to a solenoid 113. Such circuits are limited to being able to only operate one solenoid at a time, and the copper wires 114 and 115 cannot be buried in the ground or they will be exposed to galvanic deterioration.

Figure 4:
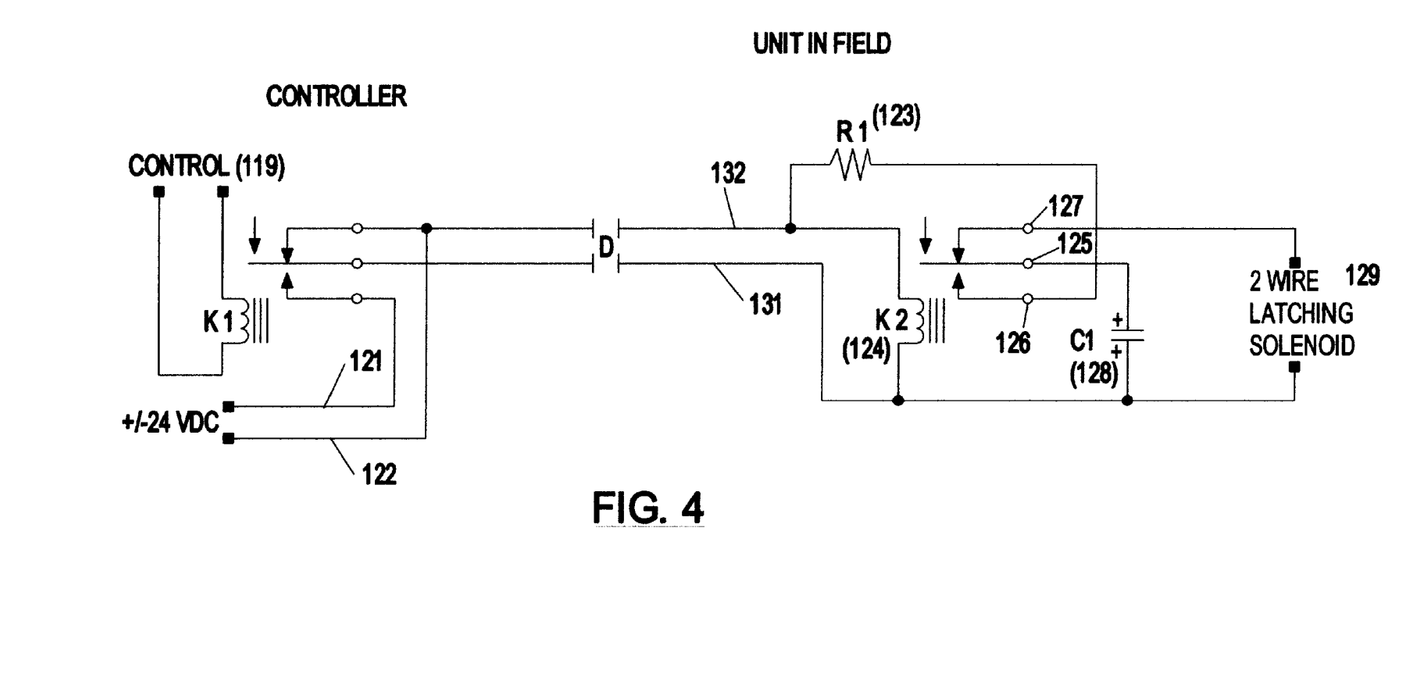
FIG. 4 is a schematic diagram of an actuator circuit of the present invention with controller for use in a commercial environment.
Figure 5:
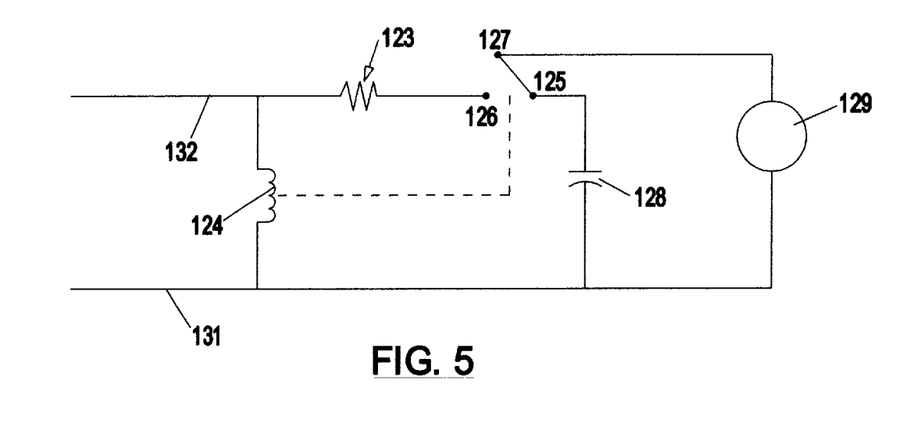
FIG. 5 is another schematic diagram of the actuator circuit of the present invention for use in a commercial environment.
Figure 6:
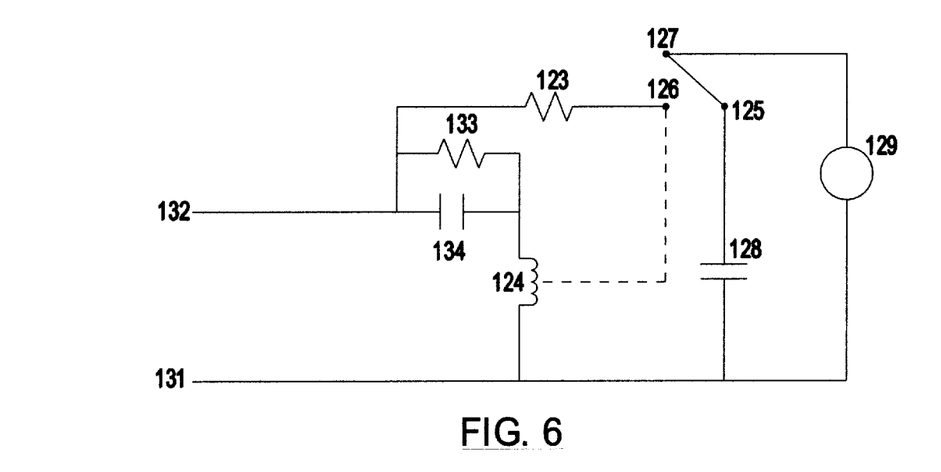
FIG. 6 is a schematic diagram of an alternative embodiment of the actuator circuit of the present invention.

Referring then to FIGS. 4, 5 and 6, it is seen that a typical circuit of the present invention includes input leads 131 and 132 from a direct current (DC) power source (or controller) 12. Circuitry within the controller determines the polarity of the power provided to lines 131 and 132, depending on whether such power is being sent to latch (normal polarity) or unlatch (reverse polarity) the solenoid. A relay coil 124 (K2) is provided on lines 131 and 132. When a DC voltage is applied to coil 124, it closes contacts 125 and 126. This brings capacitor 128 (C1) and resistor 128 (R1) into the circuit, causing the capacitor 128 to become charged over resistor 123.

When a DC voltage is applied to the relay coil, the only current draw is to that coil. For illustrative purposes, a typical coil may draw approximately 15 milliamps, although coils having a much lower draw could be used. This load would be considered the inrush current in normal solenoid operation. Since the inrush and holding current are the same in DC operations, this is ago the holding current. Including the resistor 123 could add, for example, about 5 milliamps for a total of 20. Of course different combinations of coils and resistors could be used to bring down the draw to as little as 10 total milliamps. This compares to the very high inrush current required by AC solenoids (on the order of 500 milliamps) which is eliminated in the DC circuit of the present invention.

After a time interval sufficient to charge capacitor 128 (usually only a few seconds), the DC power is removed from the circuit, causing the coil and the relay to drop out. This causes contacts 125 and 127 to connect. This results in the completion of a secondary circuit involving capacitor 128 and switch or latching solenoid 129 whereby capacitor 128 discharges into switch or solenoid 129 causing it to latch. Later, when it is time to toggle the switch or unlatch the solenoid, DC power with reversed polarity is applied to lines 131 and 132. Relay 124 is once again activated for a few seconds, sufficient for capacitor 128 to again become charged, this time with opposite polarity. When power is removed from the circuit, relay 124 drops out and contacts 125 and 127 are again joined. This results in an oppositely polarized discharge from capacitor 128 to switch or solenoid 129 causing it to unlatch.

The galvanic effect of buried copper wires carrying DC power is virtually eliminated with this circuit since the DC power is only applied over lines 131 and 132 for very short time intervals (1 to 20 seconds) and only at the beginning and at the end of the valve operation. Accordingly, very little current is expended at all, making the invention ideal for use in battery operated systems. This compares to the constant holding currents required in standard 24 volt AC systems (on the order of 250 milliamps), and those required in my '421 device (on the order of 60 milliamps) which, although small, would not be ideal for battery operation.

Since this is a DC system, there is no capacitive coupling or floating voltage problem. Multiple switches or valve solenoids can be operated in parallel with this design, as many as 20 at a time if needed, which is common in agricultural applications.

One of the most significant advantages of the present system is the very long distance that a switch or valve solenoid can be placed away from a controller. A known battery controller advertises a distance of up to 800 feet between controller and valve using 14 gauge wire. However, the present invention using 14 gauge wire allows a round trip distance of over 19 miles! In particular, 14 gauge wire has a known resistance of approximately 2.5 ohms per 1000 ft. Allowing 500 ohms of resistance over the line (which reserves as much as 1500 ohms for the relay coil 124 and resistor 123) results in an available distance of 2000,000 feet. This translates to 38.02 miles, or a distance D of over 19 miles between controller and circuit. Using much smaller 20 gauge wire having a known resistance of 10 ohms per 1000 ft., and again allowing 500 ohms of resistance over the wire, the result is still 50,000 feet which translates to 9.47 miles or a distance D of over 4.7 miles between controller and circuit.

In the alternative embodiment of FIG. 6, the DC pulse still arrives across lines 131–132. Relay coil 124 is activated (closing contacts 125 and 126) through by the initial DC voltage through capacitor 134. Once activated, capacitor 134 becomes fully charged and opens so that coil 124 is held activated by means of the voltage through resistor 133. Since the typical holding voltage of a DC relay coil is ten percent (10%) of the nominal (activating) voltage, a resistor on the order of two to three times the coil DC resistance should be adequate to keep the relay activated as long as the DC pulse is present across input 131–132.

As a result of this alternate design, the current to the circuit is further reduced by approximately another 50% on the average from the circuit of FIG. 5. The average DC current can thereby be on the order of about 10 milliamps. By this further reduction, twice the distance can be attained (because of half of the current) from FIG. 5. In addition, this further reduces the current demand on the controller DC supply, doubling its life expectancy. Or, alternately, twice as many valves can be operated with the design of FIG. 6.

For illustrative purposes and by way of example only, and without limiting the scope of the appended claims herein, using a 24 volt DC power source, a relay coil 124 may be selected having a resistance of 1500 ohms, a resistor 123 may be selected having a resistance of as high as 5000 ohms, a non-polarity sensitive capacitor 128 may be selected having a capacitance of 1000 micro farads (F) at 25 volts, and a switch or latching solenoid 129 may be selected having a coil resistance of between 5 and 10 ohms. If the relay coil requires 15 volts for activation, then approximately 937.5 ohms of calculated resistance are available for the wire. This is based on solving the equation $R=E/I$ (Resistance=Voltage/Current) with 15 volts (pull in voltage of relay) to 24 volts (supplied voltage) with coil resistance of 1500 ohms. Using 14 gauge wire at 2.5 ohms of resistance per 1000 ft., this translates into a distance of 375,000 feet (over 70 miles); using 20 gauge wire at 10 ohms of resistance per 1000 ft. this translates into a distance of 93,700 feet (over 17.7 miles).

Establishing the values of these circuit parts requires making a determination of the energy needed to reliably activate the solenoid under field conditions. This will fix the value of capacitor 128. Then the resistance of resistor 123 must be established. This will be a compromise between the desired maximum distance of the wire run and the time required to charge the capacitor. A high resistance, long wire run would add to the charge time of the capacitor by adding the wire resistance to that of resistor 123. Typically, this may add as much as another ten percent (10%) of charge time, since a wire resistance of 500 ohms in series with resistor 123 having a resistance of 5000 ohms is ten percent (10%). Once the capacitor, resistor and wire lengths are determined, the time interval for charging the capacitor can be computed. Normally, a charging time of between 2 and 20 seconds is adequate for this purpose. By using a higher DC voltage (e.g. 36 volts), the charging time interval can be reduced. This time can be programmed into the controller software for a precisely timed DC pulse.

DESCRIPTION OF THE PREFERRED EMBODIMENTS

In the preferred embodiment, a single 3.6 volt AA sized lithium battery 11 is used to power the printed circuit board 12, and a group of 9-volt replaceable lithium batteries 17 are used in series to provide a multiple of 9 (e.g. 18, 27, 36, 45 etc.) volts of power to the capacitors. Alternatively, any combination of DC batteries 17 providing a voltage of between 9 and 36 volts may be used. Each capacitor 19 (C1 in FIG. 2) should have a capacity of between approximately 1000 and 2500 micro farads (F) at 25 volts, preferably 2200 F at 25 volts.

The delay time before each capacitor is allowed to be charged is approximately 5 seconds, although a longer time interval may be employed (e.g. 10 seconds) so long as it is reasonably close to the time for discharge so that leakage is minimized. A 5 time constant interval generally allows the 2200 F capacitor 19 to reach a 98% charge from an 18-volt power supply 17 before it is discharged to solenoid 20, thereby avoiding any leakage. If a 36-volt power supply is used (i.e. four 9-volt batteries), a shorter interval (e.g. 2–3 seconds) is all that is required.

The capacitor-charging battery source 17 should be isolated from the capacitors at some time prior to discharge of the capacitors. Although this isolation may be performed at any time before discharge, the preferred time interval is approximately 31 milliseconds.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

In particular, it should be noted that although the diagram of FIG. 2 shows circuitry for operation of a single capacitor and switch/solenoid, this circuitry can be easily adapted for use in controlling multiple capacitors and switches/solenoids while maintaining the same power saving features of the invention (maintaining capacitor in discharged condition until just seconds prior to discharge, isolation of capacitor from power source immediately prior to discharge, quiescent circuitry, etc.).

We claim:

1. A circuit for energizing a valve solenoid comprising:
   a. a first DC battery power source, at least one DC charge storage means, a first switchable connection between said first power source and said DC charge storage means, and a second switchable connection between said DC charge storage means and said solenoid; and
   b. a second low voltage DC battery power source, and a controller means connected to said low voltage DC battery power source for controlling said first and second switchable connections such that said first connection defaults to an open condition, but upon the commencement of a programmed operation by said controller, said first connection is closed for a measured interval in order to provide a charge to said DC charge storage means whereupon said first connection is again opened just before said second connection is closed causing said DC charge storage means to be discharged to a valve solenoid.

2. The circuit of claim 1 wherein a third switchable connection is provided between said DC charge storage means and said solenoid, said third connection including circuitry to reverse the polarity of the charge to said solenoid such that upon the conclusion of a programmed operation by said controller, said first connection is closed for a measured interval in order to provide a charge to said DC charge storage means whereupon said first connection is again opened just before said third connection is closed causing said DC charge storage means to be discharged to said solenoid.

3. The circuit of claim 2 wherein said controller means includes an internal clock and is connected to an input means, said controller means being programmed to default to a low power-consuming state except for periodic sampling of said input means at preset intervals according to said clock.

4. The circuit of claim 2 wherein the measured interval for providing a charge to said DC charge storage means is between one and twenty seconds.

5. The circuit of claim 2 wherein the time between the opening of said first connection and the discharge of said DC charge storage means to said solenoid is about 31 milliseconds.

6. The controller of claim 2 wherein said first DC battery power source has a voltage of between 9 and 36 volts DC.

7. The controller of claim 2 wherein said second low voltage DC battery power source has a voltage of between about 3 and about 4 volts DC.

8. The controller of claim 2 wherein said DC charge storage means has a capacity of between 1000 and 2500 micro farads.

9. A controller for operating a remote switch comprising:
   a. a computing means including an internal clock;
   b. resettable input means connected to said computing means for supplying a signal thereto;
   c. a first means for supplying low voltage electrical energy to said computing means;
   d. a second means for supplying higher voltage electrical energy to said circuit;
   e. at least one DC charge storage means;
   f. a first switchable connection means between said higher voltage energy supply means and said DC charge storage means, said connection being controlled by said computing means according to an input signal such that said first connection is closed for a pre-determined time interval and thereafter opened in order to provide a charge to said DC charge storage means; and
   g. a second switchable connection means between said DC charge storage means and a remote switch, said second connection being controlled by said computing means such that said second connection is closed immediately following the opening of said first connection in order to discharge said DC charge storage means to said remote switch.

10. The controller of claim 9 further including a means between said DC charge storage means and said remote switch controlled by said computing means for reversing the polarity of the discharge from said DC charge storage means to said remote switch.

11. The controller of claim 10 wherein said first switch is closed for a pre-determined interval and thereafter opened in order to provide a charge to said DC charge storage means, said reversing means is activated in order to reverse the polarity of the discharge to said remote switch, and said second connection is then closed immediately following the opening of said first connection in order to discharge said DC charge storage means to said remote switch.

12. The controller of claim 9 wherein said computing means remains inactivated except about ten times per second for about 10 milliseconds at which time said clock causes said computing means to sample said resettable switches to determine whether any input signal is present.

13. The controller of claim 9 wherein said pre-determined time interval is between about one and about twenty seconds.

14. The controller of claim 9 wherein said first means for supplying low voltage electrical energy is a battery source having a voltage of between about 3 and about 4 volts DC.

15. The controller of claim 9 wherein said second means for supplying higher voltage electrical energy is a battery source having a voltage of between 9 and 36 volts DC.

16. The controller of claim 9 wherein said DC charge storage means has a capacity of between 1000 and 2500 micro farads.

17. The controller of claim 9 wherein there is a distance of up to four miles between said high voltage energy supply and said first switchable connection.

18. A battery powered valve control system comprising:
   a. a microprocessor including an internal clock for controlling an electrical circuit;

b. an input means connected to said microprocessor, said microprocessor being programmed to remain inactive except about ten times per second for an interval of about 10 milliseconds at which time said clock causes said microprocessor to sample said input means to determine whether any operation should be performed;

c. a first DC battery power source having a voltage of between about 3 and about 4 volts DC for supplying electrical energy to said microprocessor;

d. a second DC battery power source having a voltage of between 9 and 36 volts DC for supplying electrical energy to said circuit;

e. at least one DC charge storage means having a capacity of between 1000 and 2500 micro farads;

f. a first switchable connection between said second power source and said DC charge storage means, said connection being controlled by said microprocessor according to an input signal such that said first connection is closed for an interval of approximately five seconds and thereafter opened in order to provide a charge to said DC charge storage means;

g. a relay between said DC charge storage means and a solenoid, said relay being controlled by said microprocessor such that said relay is closed several milliseconds following the opening of said first connection in order to discharge said DC charge storage means to said solenoid; and h. a second relay between said DC charge storage means and said solenoid controlled by said microprocessor for alternatively reversing the polarity of the discharge from said DC charge storage means to said solenoid.

19. A circuit for energizing an external switch on a DC (direct current) line comprising two input lines for bringing DC voltage to said circuit, an activatable switching means connected to said input lines for controlling a set of contacts, said contacts being capable of closing in order to complete a first sub-circuit in parallel with said switching means or opening to complete a second sub-circuit including said external switch, said first sub-circuit including a resistance means between one of said input lines and said contacts and a non-polarity sensitive DC charge storage means between said other input line and said contacts, said external switch being connected to a line between said other input line and said contacts wherein as a low voltage DC current is supplied on said input lines, said switching means closes said contacts resulting in the storage of a charge in said DC charge storage means, such that when all voltage to the circuit is eliminated, said switching means drops out causing said contacts to open resulting in the discharge of the DC charge storage means into a first lead on said external switch.

20. The circuit described in claim 19 wherein by supplying oppositely polarized low voltage DC current, said DC charge storage means discharges into an opposite lead on said external switch.

21. A circuit for energizing an external switch on a DC (direct current) line comprising two input lines for bringing DC voltage to said circuit, an activatable switching means connected to said input lines for controlling a set of contacts, said contacts being capable of closing in order to complete a first sub-circuit in parallel with said switching means or opening to complete a second sub-circuit including said external switch, said first sub-circuit including a resistance means between one of said input lines and said contacts and a non-polarity sensitive DC charge storage means between said other input line and said contacts, said external switch being connected to a line between said other input line and said contacts, wherein a second DC charge storage means is provided in series with said switching means, and a second resistance means is provided in said series with said switching means and wherein as a low voltage DC current is supplied on said input lines, said switching means is activated closing said contacts resulting in the storage of a charge in both of said DC charge storage means, whereupon as said second DC charge storage means becomes fully charged, said switching means is maintained through said second resistance means, and when all voltage to the circuit is eliminated, said switching means drops out causing said contacts to open resulting in the discharge of said first DC charge storage means into one lead on said external switch.

22. The circuit described in claim 21 wherein by supplying oppositely polarized low voltage DC current, said first DC charge storage means discharges into an opposite lead on said external switch.

23. A circuit for energizing an external switch on a DC (direct current) line comprising:

a. a switching means connected in said circuit, said switching means controlling a set of contacts connected to one terminal of said external switch;

b. a resistance means and a non-polarity sensitive DC charge storage means connected in said circuit in parallel to said switching means, said resistance means separated from said DC charge storage means by the contacts controlled by said switching means;

c. a line between said DC charge storage means and the opposite terminal of said external switch wherein as a low voltage DC current is supplied, said switching means closes said contacts resulting in the storage of a charge in said DC charge storage means, such that when all voltage to the circuit is eliminated, said switching means drops out causing said contacts to open resulting in the discharge of the DC charge storage means into one terminal of switch.

24. The circuit described in claim 23 wherein by supplying oppositely polarized low voltage DC current, said DC charge storage means discharges into the opposite terminal on said external switch.

25. A circuit for energizing an external switch on a DC (direct current) line comprising:

a. a switching means connected in said circuit, said switching means controlling a set of contacts connected to one terminal of said external switch;

b. a resistance means and a non-polarity sensitive DC charge storage means connected in said circuit in parallel to said switching means, said resistance means separated from said DC charge storage means by the contacts controlled by said switching means;

c. a line between said DC charge storage means and the opposite external of said external switch;

d. a second DC charge storage means provided in series with said switching means; and e. a second resistance means provided in said series with said switching means wherein as a low voltage DC current is supplied, said switching means is activated closing said contacts resulting in the storage of a charge in both of said DC charge storage means, whereupon as said second DC charge storage means becomes fully charged, said switching means is maintained through said second resistance means, and when all voltage to the circuit is eliminated, said switching means drops out causing said contacts to open resulting in the discharge of said first DC charge storage means into one terminal on said external switch.

26. The circuit described in claim 25 wherein by supplying oppositely polarized low voltage DC current, said first DC charge storage means discharges into the opposite terminal on said external switch.

27. A battery-powered remote switch control system comprising:
   a. a controller including a programmable processor having changeable inputs and a clock;
   b. an external switch separated from said controller by a distance of up to four miles;
   c. a pair of lines between said controller and said external switch for carrying DC power from said controller to said external switch;
   d. a first low voltage DC battery power source in said controller for supplying power to said processor;
   e. a second higher voltage DC battery power source in said controller for supplying power to said external switch;
   f. circuitry in the vicinity of said external switch comprising at least one DC charge storage means on one of said lines, an activatable switching means connected to said pair of lines for controlling a set of contacts, said contacts being capable of closing in order to complete a first sub-circuit in parallel with said switching means or opening to complete a second sub-circuit including said external switch, said first sub-circuit including a resistance means between a first of said lines and said contacts and a non-polarity sensitive DC charge storage means between the second of said lines and said contacts, said external switch being connected to a third line between said second line and said contacts;
   g. wherein upon the commencement of a programmed operation by said controller, low voltage DC current is supplied on said first and second lines for a measured time interval, such that said switching means closes said contacts resulting in the storage of a charge in said DC charge storage means; and
   h. wherein at the end of such time interval said controller removes all voltage from said lines, such that said switching means drops out causing said contacts to open resulting in the discharge of the DC charge storage means into said external switch.

28. The system of claim 27 wherein said controller is capable of reversing the polarity of the DC charge sent along said pair of lines.

29. The system of claim 27 wherein said controller is programmed to default to a dormant low power-consuming state except for periodic sampling of said input at preset intervals according to said clock.

* * * * *